(12) United States Patent
Emery et al.

(10) Patent No.: US 7,424,221 B2
(45) Date of Patent: Sep. 9, 2008

(54) OPTICAL NETWORK TERMINAL WITH ILLEGAL TRANSMISSION DETECTION CIRCUITRY

(75) Inventors: Clayton J. Emery, Davie, FL (US); Richard B. Joerger, Davie, FL (US)

(73) Assignee: Tellabs Petaluma, Inc., Petaluma, CA (US)

( * ) Notice: Subject to any disclaimer, the term of this patent is extended or adjusted under 35 U.S.C. 154(b) by 615 days.

(21) Appl. No.: 11/073,127

(22) Filed: Mar. 4, 2005

(65) Prior Publication Data

US 2006/0198635 A1 Sep. 7, 2006

(51) Int. Cl.
*H04B 10/08* (2006.01)
(52) U.S. Cl. .................. 398/38; 398/33; 398/162; 398/15; 398/17; 398/22; 398/23; 398/24; 398/25; 398/26; 398/27; 398/195; 398/197; 398/200; 398/135; 398/136; 398/137; 398/138; 398/139; 398/72; 398/79; 398/94; 398/182; 398/183

(58) Field of Classification Search .................. 398/33, 398/38, 162, 17, 22, 23, 24, 25, 26, 27, 66, 398/67, 68, 70, 71, 72, 78, 98, 99, 100, 135, 398/182, 195, 197, 79, 136, 93, 94, 95, 15, 398/137, 138, 139, 183, 186, 192, 196, 200
See application file for complete search history.

(56) References Cited

U.S. PATENT DOCUMENTS

| 6,108,114 | A | 8/2000 | Gilliland et al. ............. 359/187 |
| 6,647,212 | B1 | 11/2003 | Toriumi et al. ............. 398/120 |
| 7,062,177 | B1* | 6/2006 | Grivna et al. ................ 398/162 |
| 2006/0045529 | A1* | 3/2006 | Best ............................ 398/99 |
| 2006/0093356 | A1* | 5/2006 | Vereen et al. ................. 398/33 |

* cited by examiner

*Primary Examiner*—Hanh Phan
(74) *Attorney, Agent, or Firm*—Marc C. Pickering

(57) ABSTRACT

An optical network terminal, which includes an optical transmitter, monitors the status of the optical transmitter, such as the output or the power consumption of the optical transmitter, to determine when the optical transmitter is illegally transmitting. When an illegal transmission is detected, the optical network terminal removes power from the optical transmitter.

19 Claims, 3 Drawing Sheets

OPTICAL NETWORK TERMINAL WITH ILLEGAL TRANSMISSION DETECTION CIRCUITRY

BACKGROUND OF THE INVENTION

1. Field of the Invention

The present invention relates to optical network terminals and, more particularly, to an optical network terminal with illegal transmission detection circuitry.

2. Description of the Related Art

A fiber-to-the-x (FTTx) passive optical network (PON) is a point-to-multipoint communications network. Examples of an FTTx network include a fiber-to-the-curb (FTTC) network and a fiber-to-the-home (FTTH) network. In an FTTx network, downstream data packets are transmitted from an optical line terminal (OLT) to a number of optical network terminals (ONT) that are located at or near a corresponding number of end users. Upstream data packets, on the other hand, are transmitted from the ONTs back to the OLT.

FIG. 1 shows a block diagram that illustrates a prior-art example of an optical network terminal (ONT) 100. As shown in FIG. 1, ONT 100 includes an optical transmitter 110 that generates an upstream data packet DP in response to an outgoing data packet DTX, and determines an output power level in response to a measured power signal TPC. In addition, optical transmitter 110 outputs the upstream data packet DP with the output power level when a transmit enable signal EN is asserted.

As further shown in FIG. 1, ONT 100 also includes a photo detector 112 that detects when optical transmitter 110 is transmitting. Photo detector 112 measures the transmit power level output by optical transmitter 110, and outputs the measured power signal TPC to optical transmitter 110 to indicate the measured transmit power level. Transmitter 110 can then modify the transmit power level as needed to insure that the correct transmit power is output.

ONT 100 additionally includes a power supply 114 that provides the necessary voltages and currents to optical transmitter 110, and a media access controller (MAC) 116 that generates the outgoing data packet DTX in response to outgoing subscriber data SD, asserts the transmit enable signal EN when transmission is enabled, and de-asserts the transmit enable signal EN when transmission is disabled.

One problem which can arise with an ONT, such as ONT 100, is when an ONT fails due to hardware or software problems which cause the ONT to transmit at the wrong time. If a first ONT transmits during a time slot which has been assigned to a second ONT and both ONTs attempt to transmit at the same time, a collision results which can cause the data packets output by both ONTs to be lost.

Thus, when the optical transmitter of an ONT "sticks on" and continuously transmits during all of the assigned time slots, the entire FTTx network can be rendered incapable of any communication between the ONTs and the OLT. An ONT that transmits in the upstream direction during the wrong time slot, such as a continuously transmitting ONT, is known as a "rogue ONT". Thus, in order to prevent a rogue ONT from incapacitating an entire a FTTx network segment, there exists a need for an ONT that can detect when it is illegally transmitting, and turn itself off.

SUMMARY OF THE INVENTION

An optical network terminal is disclosed according to an embodiment of the present invention. The optical network terminal includes an optical system to generate an upstream data packet in response to an outgoing data packet, and determine an output power level. The optical system to output the upstream data packet with the output power level in response to a transmit enable signal when the optical system receives power.

In addition, the optical network terminal includes a processing circuit to generate the outgoing data packet in response to outgoing information, and the transmit enable signal when the upstream data packet is to be transmitted. The processing circuit to control power provided to the optical system in response to an illegal transmission signal.

The optical network terminal also includes an improper transmission detector connected to the optical system and the processing circuit. The improper transmission detector to detect when the optical system is improperly transmitting, and assert the illegal transmission signal when the optical system is improperly transmitting.

A method of operating an optical network terminal is disclosed according to an embodiment of the present invention. Power is provided to an optical transmitter. When the optical transmitter is improperly transmitting, the condition is detected. When the improper transmission condition is detected, power is removed from the optical transmitter.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
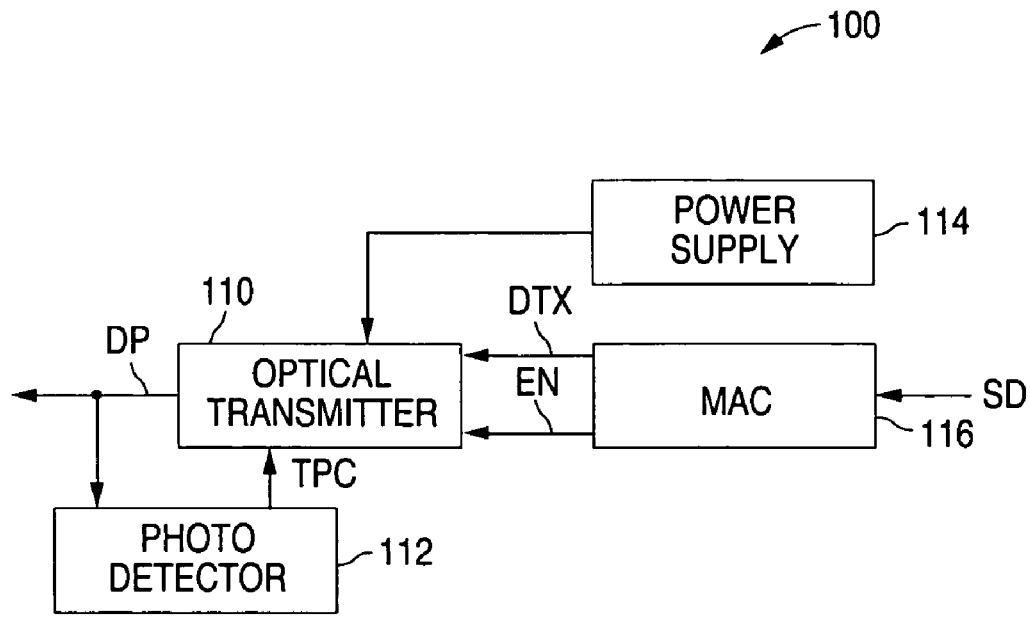
FIG. 1 is a block diagram illustrating a prior-art example of an optical network terminal (ONT) 100.
Figure 2:
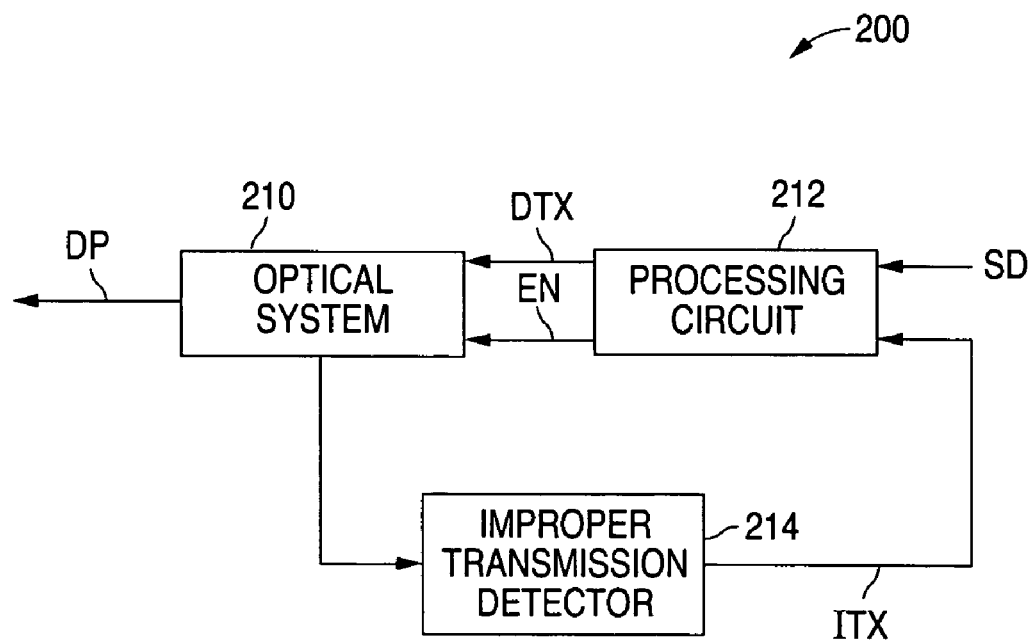
FIG. 2 is a block diagram illustrating an optical network terminal (ONT) 200 in accordance with the present invention.

FIG. 2 shows a block diagram that illustrates an optical network terminal (ONT) 200 in accordance with the present invention. As described in greater detail below, ONT 200 monitors itself to determine when it is illegally transmitting and, when an illegal transmission is detected, turns itself off.

As shown in FIG. 2, ONT 200 includes an optical system 210 that generates and outputs an upstream data packet DP to an optical line terminal (OLT) via a splitter/combiner in response to an outgoing data packet DTX. Optical system 210 determines an output power level, and outputs the upstream data packet DP with the output power level in response to a transmit enable signal EN when optical system 210 receives power.

As further shown in FIG. 2, ONT 200 also includes a processing circuit 212 that generates the outgoing data packet DTX in response to incoming subscriber data SD, and the transmit enable signal EN when the upstream data packet DP is to be transmitted. In addition, processing circuit 212 controls power provided to optical system 210 in response to an illegal transmission signal ITX.

In accordance with the present invention, ONT 200 additionally includes an improper transmission detector 214 that is connected to optical system 210 and processing circuit 212. Improper transmission detector 214 detects when optical system 210 is improperly transmitting, and asserts the illegal transmission signal ITX when optical system 210 is improperly transmitting.

When the illegal transmission signal ITX is detected, processing circuit 212 removes power from optical system 210. Without power, optical system 210 is unable to transmit (although power can optionally be maintained to the control circuits). As a result, processing circuit 212 removes ONT 200 from the network as soon as ONT 200 becomes a rogue ONT.

Figure 3:
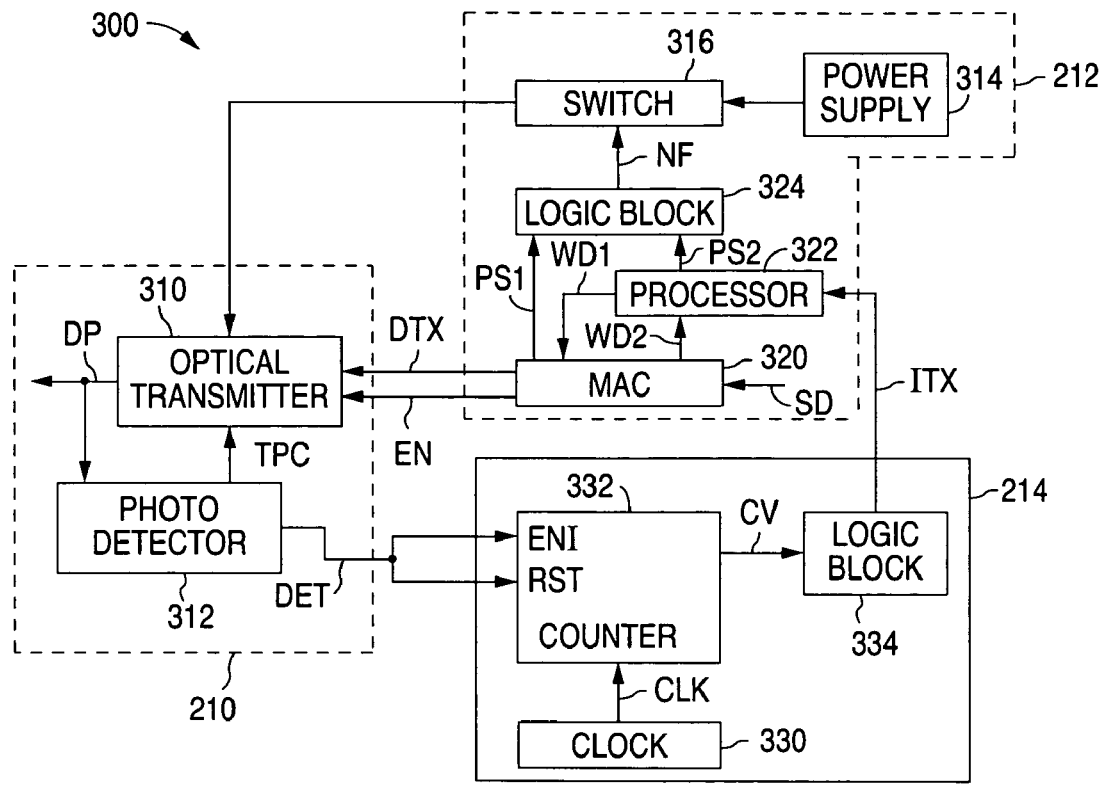
FIG. 3 is a block diagram illustrating an example of an embodiment 300 of ONT 200 in accordance with the present invention.

FIG. 3 shows a block diagram that illustrates an example of an embodiment 300 of ONT 200 in accordance with the present invention. As shown in FIG. 3, optical system 210 in embodiment 300 of ONT 200 includes an optical transmitter 310 that determines the output power level in response to a measured power signal TPC. In addition, optical transmitter 310 outputs the upstream data packet DP with the output power level when the transmit enable signal EN is asserted and optical transmitter 310 receives power.

Optical system 210 in embodiment 300 of ONT 200 also includes a photo detector 312 that detects when optical transmitter 310 is transmitting. Photo detector 312 measures the transmit power level output by optical transmitter 310, and outputs the measured power signal TPC to optical transmitter 310 to indicate the measured transmit power level. Transmitter 310 can then modify the transmit power level as needed to insure that the correct transmit power is output.

In addition, in the present embodiment of the invention, photo detector 312 of embodiment 300 also asserts a transmission detection signal DET when a transmission is detected, and de-asserts the transmission detection signal DET when the transmission is no longer detected.

As further shown in FIG. 3, processing circuit 212 in embodiment 300 of ONT 200 includes a power supply 314 that provides the necessary voltage and current to operate optical transmitter 310, and a power switch 316 that is connected between optical transmitter 310 and power supply 314.

Power switch 316 closes or opens a current path in response to a closed/open signal NF. In the present example, power switch 316 closes the current path to provide power when the closed/open signal NF is asserted, and opens the current path to remove power when the closed/open signal NF is de-asserted.

Processing circuit 212 in embodiment 300 of ONT 200 also includes a media access controller (MAC) 320, a microprocessor 322, and a logic block 324. MAC 320 generates the outgoing data packet DTX in response to the outgoing subscriber data SD, asserts the transmit enable signal EN when transmission is enabled, and de-asserts the transmit enable signal EN when transmission is disabled. In addition, MAC 320 outputs a first power off signal PS1 to logic block 324 when power switch 316 is to be opened.

Microprocessor 322, in turn, outputs a second power off signal PS2 to logic block 324 when power switch 316 is to be opened. For example, microprocessor 322 can assert the second power off signal PS2 in response to the illegal transmission signal ITX, which microprocessor 322 receives on an interrupt input.

Logic block 324 generates the closed/open signal NF, which places power switch 316 in either a closed state or an open state, in response to the first and second power off signals PS1 and PS2. For example, logic block 324 can de-assert the closed/open signal NF to place power switch 316 in the open state when the first or the second power off signal PS1 or PS2 is asserted, and assert the closed/open signal NF when power off signals PS1 and PS2 are both de-asserted.

MAC 320 and processor 322 also exchange watchdog signals WD1 and WD2 such that MAC 320 has a watch dog that is petted by processor 322 and processor 322 has a watch dog that is petted by MAC 320. If MAC 320 or processor 322 fails to respond within a predefined time frame or fails to verify its functionality, then the monitoring element can stop optical transmitter 310 by asserting the power off signal PS1 or PS2.

As a result, if processor 322 fails, MAC 320 can shut down optical transmitter 310 by asserting the first power off signal PS1. Similarly, if MAC 320 fails, processor 322 can shut down optical transmitter 310 by asserting the second power off signal PS2. Thus, both MAC 320 and processor 322 have the ability to shut down the transmitter when necessary by outputting the first or second power off signal PS1 or PS2.

As further shown in FIG. 3, illegal transmission detector 214 in embodiment 300 of ONT 200 includes a clock circuit 330 that outputs a clock signal CLK, a counter 332 that counts the clock signal CLK and outputs a count value CV in response to the transmission detection signal DET, and a logic block 334 that asserts the illegal transmission signal ITX when the count value CV reaches a predetermined count value. Counter 332 can either count up or count down in response to the clock signal CLK.

For example, counter 332 can have an enable input ENI and a reset input RST that are both connected to receive the transmission detection signal DET such that when the transmission detection signal DET is asserted, counter 332 is both enabled and initialized. In addition, logic block 334 can be implemented so that a logic high is generated when counter 332 has reached the end of its range, counting up from zero to all ones.

During normal operation, logic block 324 asserts the closed/open signal NF to place power switch 316 in the closed state which, in turn, provides power to optical transmitter 310. In addition, when an upstream data packet DP is ready to be transmitted, MAC 320 asserts the transmit enable signal EN. In response, transmitter 310 outputs the upstream data packet DP to the OLT via the splitter/combiner.

When optical transmitter 310 outputs the upstream data packet DP, photo detector 312 detects the transmission, and asserts the transmission detection signal DET. The transmission detection signal DET both resets and enables counter 332 of illegal transmission detector 214. When enabled, counter 332 begins counting the clock signal CLK.

After the upstream data packet DP has been transmitted, MAC 320 de-asserts the transmit enable signal EN which, in turn, causes optical transmitter 310 to stop transmitting. When optical transmitter 310 stops transmitting, photo detector 312 detects this condition and de-asserts the transmission detection signal DET. When the transmission detection signal DET is de-asserted, counter 332 is no longer enabled, thereby terminating the count before the count value CV reaches the predetermined count value, such as all ones.

On the other hand, when a malfunction occurs, transmitter 310 can transmit the upstream data packet DP, and then continue transmitting non-packet values. For example, transmitter 310 may be incapable of responding to the de-asserted transmit enable signal EN. Alternately, MAC 320 may be incapable of de-asserting the transmit enable signal EN. In either case, when a malfunction occurs, transmitter 310 can continue to transmit non-packet values.

Since the transmission has not stopped, photo detector 312 continues to assert the transmission detection signal DET. As a result, counter 322 remains enabled and continues to count. After a period of time, the count value CV output by counter 332 reaches the predetermined count value, such as all ones at the upper end of the count range. When the count value CV output by counter 332 reaches the predetermined count value, logic block 334 detects this condition and asserts the illegal transmission signal ITX.

Microprocessor 322 receives the asserted illegal transmission signal ITX on the interrupt input and, in response, asserts the power off signal PS2. Logic block 324 detects the asserted power off signal PS2 and de-asserts the closed/open signal NF. Power switch 316 then responds to the de-asserted closed/open signal NF by removing power from optical transmitter 310, which thereby turns off optical transmitter 310.

Thus, when optical transmitter 310 fails to turn off in response to the de-assertion of the transmit enable signal EN, or when MAC 320 is unable to de-assert the transmit enable signal EN once asserted, photo detector 312, microprocessor 322, and illegal transmission detector 214 detect this condition and remove power from optical transmitter 310, thereby removing ONT 200 from the network as soon as ONT 200 becomes a rogue ONT.

Figure 4:
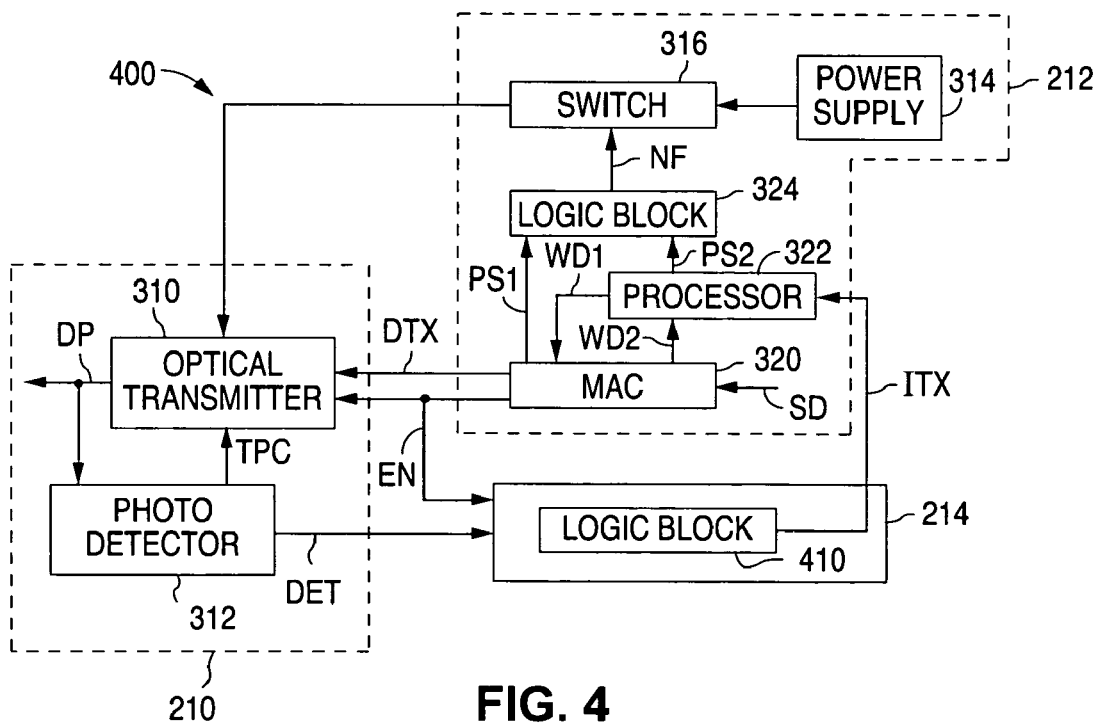
FIG. 4 is a block diagram illustrating an example of an embodiment 400 of ONT 200 in accordance with the present invention.

FIG. 4 is a block diagram illustrating an example of an embodiment 400 of ONT 200 in accordance with the present invention. Embodiment 400 is similar to embodiment 300 and, as a result, utilizes the same reference numerals to designate the structures which are common to both embodiments.

As shown in FIG. 4, embodiment 400 differs from embodiment 300 in that illegal transmission detector 214 of embodiment 400 is implemented with a logic block 410 that is connected to photo detector 312, MAC 320, and processor 322. Logic block 410 asserts the illegal transmission signal ITX when the transmission detection signal DET indicates that optical transmitter 310 is transmitting, and the transmit enable signal EN indicates that optical transmitter 310 should not be transmitting. For example, logic block 410 can assert the illegal transmission signal ITX when the transmit enable signal EN has been de-asserted, but the transmission detection signal DET remains asserted.

As before, during normal operation, logic block 324 asserts the closed/open signal NF to place power switch 314 in the closed state which, in turn, provides power to optical transmitter 310. In addition, when an upstream data packet DP is to be transmitted, MAC 320 asserts the transmit enable signal EN. In response, transmitter 310 outputs the upstream data packet DP to the OLT via the splitter/combiner.

When optical transmitter 310 outputs the upstream data packet DP, photo detector 312 detects the transmission, and asserts the transmission detection signal DET. Logic block 410 of illegal transmission detector 214 detects the asserted logic states of the transmission enable signal EN and the transmission detection signal DET, and de-asserts the illegal transmission signal ITX.

After the upstream data packet DP has been transmitted, MAC 320 de-asserts the transmit enable signal EN which, in turn, causes optical transmitter 310 to stop transmitting. When optical transmitter 310 stops transmitting, photo detector 312 detects this condition and de-asserts the transmission detection signal DET. Logic block 410 detects the de-asserted logic states of the transmission enable signal EN and the transmission detection signal DET, and maintains the illegal transmission signal ITX in the de-asserted state.

On the other hand, when ONT 200 has malfunctioned, optical transmitter 310 is incapable of responding to the de-asserted transmit enable signal EN which, in turn, allows optical transmitter 310 to continue transmitting non-packet values. Since the transmission has not stopped, photo detector 312 continues to assert the transmission detection signal DET.

Logic block 410 of illegal transmission detector 214 detects the different logic states of the transmission enable signal EN and the transmission detection signal DET, and asserts the illegal transmission signal ITX. Microprocessor 322 receives the asserted illegal transmission signal ITX on the interrupt input and, in response, asserts the second power off signal PS2. Logic block 324 detects the asserted second power off signal PS2 and de-asserts the closed/open signal NF. Power switch 316 then responds to the de-asserted closed/open signal NF by removing power from optical transmitter 310 which thereby turns off optical transmitter 310.

Thus, when optical transmitter 310 fails to turn off in response to the de-asserted transmit enable signal EN, photo detector 312, microprocessor 322, and logic block 410 detect this condition and remove power from optical transmitter 310, thereby removing ONT 200 from the network as soon as ONT 200 becomes a rogue ONT.

Figure 5:
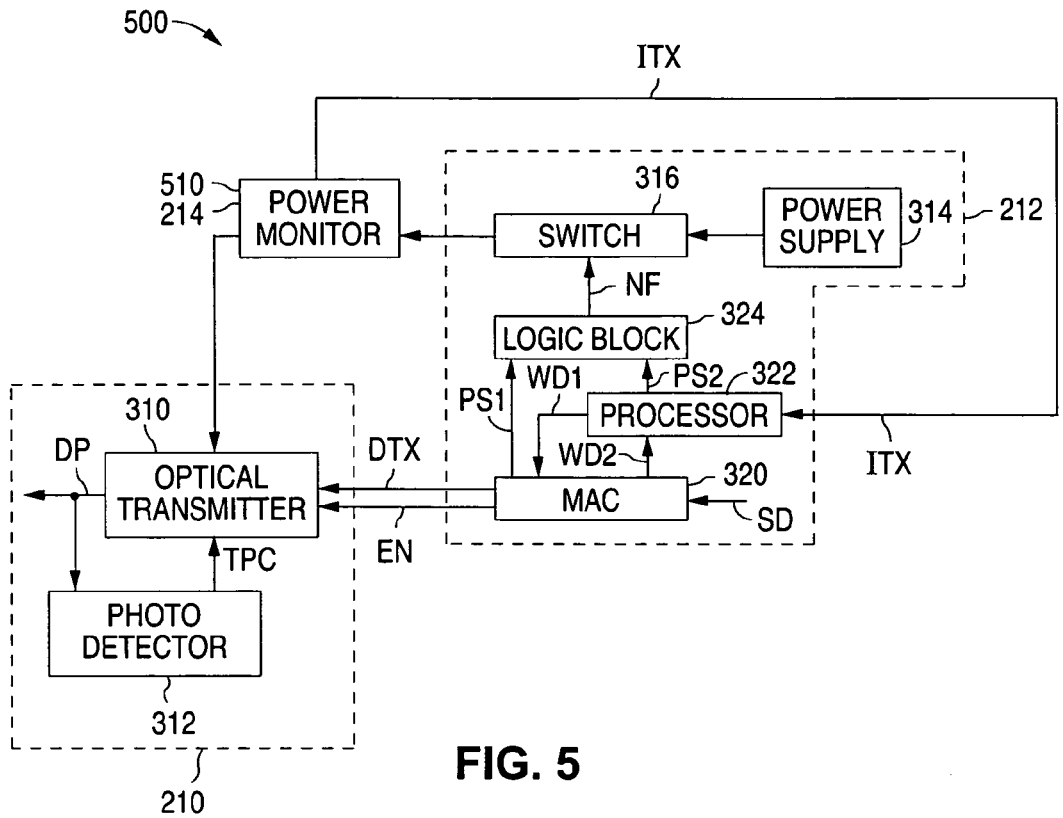
FIG. 5 is a block diagram illustrating an example of an embodiment 500 of ONT 200 in accordance with the present invention.

FIG. 5 is a block diagram illustrating an example of an embodiment 500 of ONT 200 in accordance with the present invention. Embodiment 500 is similar to embodiment 300 and, as a result, utilizes the same reference numerals to designate the structures which are common to both embodiments.

As shown in FIG. 5, embodiment 500 differs from embodiment 300 in that illegal transmission detector 214 of embodiment 500 is implemented with a power monitor 510 that is connected to optical transmitter 310, power switch 316, and processor 322. (Photo detector 312 does not output the transmission detection signal DET in embodiment 500.) Power monitor 510 monitors the power consumption or the current drawn by optical transmitter 310.

During normal operation, logic block 324 asserts the closed/open signal NF to place power switch 316 in the closed state which, in turn, provides power to optical transmitter 310. In addition, when an upstream data packet DP is ready to be transmitted, MAC 320 asserts the transmit enable signal EN. In response, transmitter 310 outputs the upstream data packet DP to the OLT via the splitter/combiner. After the upstream data packet DP has been transmitted, MAC 320 de-asserts the transmit enable signal EN which, in turn, causes optical transmitter 310 to stop transmitting.

Power monitor 510 detects the power consumed by optical transmitter 310. Thus, as optical transmitter 310 turns on and off over a time period to transmit the upstream data packet DP, power monitor 510 detects the change in the amount of power consumed by optical transmitter 310. When change is detected, power monitor 510 de-asserts the illegal transmission signal ITX.

Alternately, power monitor 510 can measure the amount of power consumed by the optical transmitter over the time period. When the amount of power consumed by the optical transmitter over the time period falls below a predetermined level, power monitor 510 de-asserts the illegal transmission signal ITX.

On the other hand, when ONT 200 fails, power monitor 510 then fails to detect a change in the amount of power consumed by optical transmitter 310 over the time period. When power monitor 510 no longer detects a change in the power consumption, power monitor 510 asserts the illegal transmission signal ITX. Alternately, when the amount of power consumed by optical transmitter 310 over the time period exceeds the predetermined level, power monitor 510 asserts the illegal transmission signal ITX.

Microprocessor 322 receives the asserted illegal transmission signal ITX on the interrupt input and, in response, asserts the second power off signal PS2. Logic block 324 detects the asserted second power off signal PS2 and de-asserts the closed/open signal NF. Power switch 316 then responds to the de-asserted closed/open signal NF by removing power from optical transmitter 310 which thereby turns off optical transmitter 310.

Figure 6:
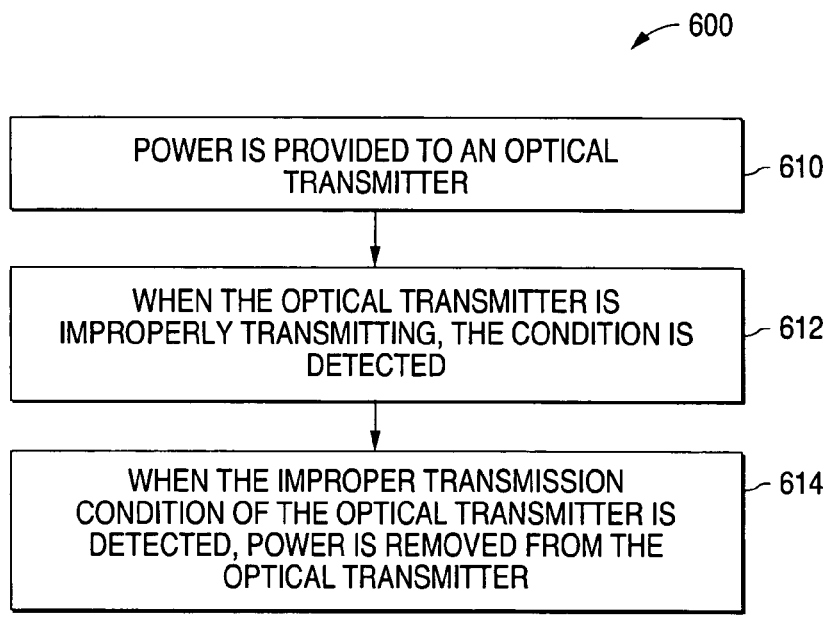
FIG. 6 is a flow chart illustrating an example of a method 600 of operating an optical network terminal in accordance with the present invention.

FIG. 6 shows a flow chart that illustrates an example of a method 600 of operating an optical network terminal in accordance with the present invention. As shown in FIG. 6, at 610, power is provided to an optical transmitter, such as optical transmitter 310. At 612, the operation of the optical transmitter is monitored and, when the optical transmitter is improperly transmitting, the condition is detected. At 614, when the improper transmission condition of the optical transmitter is detected, power is removed from the optical transmitter.

In the present invention, the optical transmitter is improperly transmitting when the optical transmitter has been continuously transmitting for a predetermined period of time, which is greater than an allowed transmission period. For example, as described with respect to FIG. 3, method 600 can count a clock signal to generate a count value when the optical transmitter transmits. In addition, method 600 can then remove power from the optical transmitter when the count value exceeds a predetermined level.

The optical transmitter is also improperly transmitting when the optical transmitter has been excessively transmitting (transmitting more than it should). For example, as described with respect to FIG. 4, method 600 can evaluate a first signal that indicates when the optical transmitter is transmitting, and a second signal that indicates when the optical transmitter is enabled to transmit.

Further, method 600 can remove power from the optical transmitter when the first signal indicates that the optical transmitter is transmitting and the second signal indicates that the optical transmitter is not enabled to transmit. The transmitter is excessively transmitting in this case because the transmitter is transmitting when it is not enabled to do so.

Alternately, as described with respect to FIG. 5, method 600 can determine a power consumption of the optical transmitter over the predetermined period of time. In addition, method 600 can remove power from the optical transmitter when the power consumption fails to change or exceeds a predefined level over the predetermined period of time. The transmitter is excessively transmitting in this case because the transmitter has consumed more power than it should have during the predetermined period of time.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An optical network terminal comprising:
   a media access controller (MAC) to generate an outgoing data packet and a transmit enable signal, the MAC asserting the transmit enable signal to enable transmission of the outgoing data packet;
   an optical transmitter connected to the MAC to receive the outgoing data packet and the transmit enable signal, and transmit the outgoing data packet to a network in response to an assertion of the transmit enable signal when power from a power source is input to the optical transmitter;
   a logic circuit connected to the MAC, the logic circuit being unconnected to the optical transmitter, the logic circuit to output a control signal with a first logic state that causes power from the power source to be input to the optical transmitter, and a second logic state that causes power from the power source to be removed from the optical transmitter; and
   a processor connected to the logic circuit, the processor to output a power off signal that causes the logic circuit to place the control signal in the second logic state when an improper transmission signal indicates that an improper transmission is occurring.

2. The optical network terminal of claim 1, and further comprising a photo detector connected to the optical transmitter, the photo detector to detect when the optical transmitter is transmitting.

3. The optical network terminal of claim 2, wherein the photo detector outputs a transmission detection signal that has a first logic state when the optical transmitter is detected to be transmitting, and a second logic state when the optical transmitter is detected to be not transmitting.

4. The optical network terminal of claim 3, and further comprising an improper transmission detector connected to the photodetector and the processor, the improper transmission detector generating the improper transmission signal with a first logic state when an improper transmission is occurring, and a second logic state when a proper transmission is occurring.

5. The optical network terminal of claim 4, wherein the improper transmission signal has the first logic state indicating an improper transmission is occurring when the transmission detection signal has the first logic state indicating that the optical transmitter is transmitting, and the transmit enable signal indicates that no transmission is enabled.

6. The optical network terminal of claim 4, wherein the improper transmission signal has the first logic state indicating an improper transmission is occurring when the transmission detection signal has had the first logic state for more than a predetermined period of time.

7. The optical network terminal of claim 6, wherein the improper transmission detector includes:
   a clock to generate a clock signal;
   a counter to count the clock signal and output a count value, the counter being reset and enabled in response to the first logic state of the transmission detection signal; and
   a logic block to place the illegal transmission signal in the first logic state when the count value reaches a predetermined count value.

8. The optical network terminal of claim 2, and further comprising a power monitor connected to the optical transmitter to detect a change in an amount of power consumed by the optical transmitter over a time period, and output the improper transmission signal to indicate that an improper transmission is occurring when the amount of power consumed by the optical transmitter over the time period exceeds a predetermined amount.

9. An optical network terminal comprising:
   a media access controller (MAC) to generate an outgoing data packet and a transmit enable signal, the MAC asserting the transmit enable signal to enable transmission of the outgoing data packet;
   an optical transmitter connected to the MAC to receive the outgoing data packet and the transmit enable signal, and transmit the outgoing data packet to a network in response to an assertion of the transmit enable signal when power from a power source is input to the optical transmitter;

a photo detector connected to the optical transmitter, the photo detector to detect when the optical transmitter is transmitting, measure a transmit power level when the optical transmitter is transmitting, generate a measured power signal in response to the transmit power level, and output the measured power signal to the optical transmitter to indicate a transmit power level;

a logic circuit connected to the MAC, the logic circuit to output a control signal with a first logic state that causes power from the power source to be input to the optical transmitter, and a second logic state that causes power from the power source to be removed from the optical transmitter; and a processor connected to the logic circuit, the processor to output a power off signal that causes the logic circuit to place the control signal in the second logic state when an improper transmission signal indicates that an improper transmission is occurring.

10. The optical network terminal of claim 9, wherein the photo detector outputs a transmission detection signal that has a first logic state when the optical transmitter is detected to be transmitting, and a second logic state when the optical transmitter is detected to be not transmitting.

11. The optical network terminal of claim 10, and further comprising an improper transmission detector connected to the photodetector and the processor, the improper transmission detector generating the improper transmission signal with a first logic state when an improper transmission is occurring, and a second logic state when a proper transmission is occurring.

12. The optical network terminal of claim 11, wherein the improper transmission signal has the first logic state indicating an improper transmission is occurring when the transmission detection signal has the first logic state indicating that the optical transmitter is transmitting, and the transmit enable signal indicates that no transmission is enabled.

13. The optical network terminal of claim 11, wherein the improper transmission signal has the first logic state indicating an improper transmission is occurring when the transmission detection signal has had the first logic state for more than a predetermined period of time.

14. The optical network terminal of claim 13, wherein the improper transmission detector includes:
a clock to generate a clock signal;
a counter to count the clock signal and output a count value, the counter being reset and enabled in response to the first logic state of the transmission detection signal; and
a logic block to place the illegal transmission signal in the first logic state when the count value reaches a predetermined count value.

15. The optical network terminal of claim 9, and further comprising a power monitor connected to the optical transmitter to detect a change in an amount of power consumed by the optical transmitter over a time period, and output the improper transmission signal to indicate that an improper transmission is occurring when the amount of power consumed by the optical transmitter over the time period exceeds a predetermined amount.

16. A method of operating an optical network terminal, comprising:
transmitting an outgoing data packet to a network in response to an assertion of a transmit enable signal when power from a power source is input to an optical transmitter;
outputting a control signal with a first logic state that causes power from the power source to be input to the optical transmitter, and a second logic state that causes power from the power source to be removed from the optical transmitter;
outputting a power off signal that causes the control signal to be placed in the second logic state when an improper transmission signal indicates that an improper transmission is occurring;
detecting when the optical transmitter is transmitting;
measuring a transmit power level when the optical transmitter is transmitting;
generating a measured power signal in response to the transmit power level; and
outputting the measured power signal to the optical transmitter to indicate a transmit power level.

17. The method of claim 16 and further comprising:
outputting a transmission detection signal that has a first logic state when the optical transmitter is detected to be transmitting, and a second logic state when the optical transmitter is detected to be not transmitting; and
generating the improper transmission signal with a first logic state when an improper transmission is occurring, and a second logic state when a proper transmission is occurring, the improper transmission signal having the first logic state indicating an improper transmission is occurring when the transmission detection signal has the first logic state indicating that the optical transmitter is transmitting, and the transmit enable signal indicates that no transmission is enabled.

18. The method of claim 16, and further comprising:
outputting a transmission detection signal that has a first logic state when the optical transmitter is detected to be transmitting, and a second logic state when the optical transmitter is detected to be not transmitting; and
generating the improper transmission signal with a first logic state when an improper transmission is occurring, and a second logic state when a proper transmission is occurring, the improper transmission signal having the first logic state indicating an improper transmission is occurring when the transmission detection signal has had the first logic state for more than a predetermined period of time.

19. The method of claim 16, and further comprising:
detecting a change in an amount of power consumed by the optical transmitter over a time period; and
outputting the improper transmission signal when the amount of power consumed by the optical transmitter over the time period exceeds a predetermined amount.

* * * * *